United States Patent
Busin

(10) Patent No.: US 8,855,673 B2
(45) Date of Patent: Oct. 7, 2014

(54) NETWORK LOCATION MANAGEMENT ENTITY

(75) Inventor: Åke Busin, Sollentuna (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 78 days.

(21) Appl. No.: 13/578,427

(22) PCT Filed: Feb. 16, 2010

(86) PCT No.: PCT/EP2010/000951
§ 371 (c)(1),
(2), (4) Date: Sep. 11, 2012

(87) PCT Pub. No.: WO2011/100986
PCT Pub. Date: Aug. 25, 2011

(65) Prior Publication Data
US 2013/0012228 A1 Jan. 10, 2013

(51) Int. Cl.
*H04W 64/00* (2009.01)
*H04W 8/20* (2009.01)

(52) U.S. Cl.
CPC .............. *H04W 8/20* (2013.01); *H04W 64/00* (2013.01)
USPC ..................................... 455/456.1; 455/456.3

(58) Field of Classification Search
CPC ......... H04W 4/02; H04W 4/22; H04W 64/00; H04W 64/003
USPC ......... 455/404.1, 418, 456.1, 456.3; 370/259, 370/353
See application file for complete search history.

(56) References Cited

U.S. PATENT DOCUMENTS

2006/0258373 A1* 11/2006 Muhonen et al. .......... 455/456.1

FOREIGN PATENT DOCUMENTS

WO 0025545 A1 5/2000

OTHER PUBLICATIONS

3rd Generation Partnership Project. "Update to the GMLC State Description." 3GPP Change Request, TSG-SA2 Meeting #73, S2-094091 (Revised S2-093313), Tallinn, Estonia, May 11-15, 2009.
3rd Generation Partnership Project. "Introduction of reuse mechanism of previously obtained location information." 3GPP Change Request, 3GPP TSG-SA2 Meeting #29, Tdoc S2-023076, San Francisco, CA, USA, Jan. 20-24, 2003.

* cited by examiner

*Primary Examiner* — Sam Bhattacharya
(74) *Attorney, Agent, or Firm* — Coats & Bennett, PLLC

(57) ABSTRACT

The present invention relates to a network location management entity for managing location information indicating a location of a mobile terminal in a communication network. The network location management entity comprises a provider (101) for providing pre-stored information on a network communication node which handled communications of the mobile terminal, and a transmitter (103) for transmitting a subscriber location request towards the network communication node if the pre-stored information fulfills a validity criterion, the subscriber location request requesting a transmission of the location information.

15 Claims, 7 Drawing Sheets

NETWORK LOCATION MANAGEMENT ENTITY

TECHNICAL FIELD

The present invention pertains to location services in mobile communication systems.

BACKGROUND

The increasing demand for wireless telecommunication services has resulted in the growth of many wireless telecommunication systems and increase in the number of roaming wireless subscribers. With newer third generation (3G) systems, efforts have been implemented to accommodate and distribute the increased traffic load in the network. By way of example, for handling communications such as mobile terminated calls (MTC) towards a mobile terminal or mobile originated calls (MOC) from the mobile terminal, a network communication node such as MSC (Mobile Switching Centre) may be provided.

In addition to mobile calls, also location based services (LBS, LCS) which usually require knowledge on a location of the mobile terminal in the communication network may emerge. In order to retrieve the location of the mobile terminal, first a MSC in which the mobile terminal is registered has to be determined. This may be achieved according e.g. to the 3GPP TS 23.271 standard by requesting a Home Location Register (HLR) by e.g. a GMLC (Gateway Mobile Location Centre) to provide a network address of the MSC which is currently handling communications of the mobile terminal. Thereafter, the MSC may be requested to transmit location information indicating the location of the mobile terminal. In this set-up the HLR is repeatedly queried to provide the network address of the serving MSC.

As such set-up reduces network performance, there exists a need for efficiently retrieving location information indicating a location of a mobile terminal in a mobile communication network.

SUMMARY OF THE INVENTION

The invention is based on the finding that location requests may efficiently be retrieved in a communication network if, by way of example, instead of always querying the HLR for the serving MSC, a network location management entity such as the GMLC uses the last known MSC address if available. Thus, according to some embodiments, as the target normally stays attached to the same MSC for a time period, the load on the HLR may be reduced.

According to an aspect, the invention relates to a network location management entity for managing location information indicating a location of a mobile terminal in a communication network. Preferably, the network location management entity may comprise a provider for providing pre-stored information on a network communication node which handled communications of the mobile terminal, and a transmitter for transmitting a subscriber location request towards the network communication node if the pre-stored information fulfills a validity criterion, the subscriber location request requesting a transmission of the location information. By way of example, the subscriber location request may be formed by the Mobile Terminal Location Request (MT-LR) message. The pre-stored information may be stored in a memory which may be an element of the network location management entity. However, the memory may remotely be arranged and accessible over the communication network.

According to an embodiment, the pre-stored information fulfills the validity criterion if a time period which elapsed after a transmission of a previous subscriber location request towards the network communication node is shorter than or equal to a predetermined time period, e.g. 10 min, 20 min or 30 min. The previous location request may have been transmitted by the aforementioned transmitter at an earlier time instant, by way of example.

According to an embodiment, the pre-stored information fulfills the validity criterion if the location information indicating a location of the mobile terminal was received from the network communication node upon transmitting a previous, e.g. an earlier, subscriber location request towards the network communication node.

According to an embodiment, the pre-stored information may originate from a Home Location Register or from a Home Subscriber Server, wherein the pre-stored information fulfills the validity criterion if a time period which elapsed after a reception of the pre-stored information from the Home Location Register or from the Home Subscriber Server is shorter than or equal to a predetermined time period, e.g. 10 min, 20 min or 30 min.

According to an embodiment, the pre-stored information fulfills the validity criterion if a storage period of the pre-stored information is shorter than a predetermined time period, e.g. 10 min, 20 min or 30 min.

The aforementioned validity criteria may also cumulatively be deployed.

According to an embodiment, the transmitter is configured to transmit a routing information request towards a Home Location Register or towards a Home Subscriber Server if the pre-stored information does not fulfill the validity criterion, the routing information request requesting a transmission of information on a network communication node currently managing communications of the mobile terminal.

According to an embodiment, the network location management entity may comprise a receiver for receiving the information on the network communication node over a communication network upon transmitting a routing information request towards a Home Location Register or towards a Home Subscriber Server, and a memory for pre-storing the received information to obtain the pre-stored information.

According to an embodiment, the network location management entity may comprise a receiver, e.g. the receiver mentioned above, for receiving the location information over the communication network from the network communication node.

According to an embodiment, the transmitter may be configured to transmit the routing information request towards a Home Location Register or towards a Home Subscriber Server in response to an error message received from the network communication node, the error message indicating that the network communication node is not managing communications of the mobile terminal, the routing information request requesting a transmission of information on a network communication node currently managing communications of the mobile terminal.

According to an embodiment, the network location management entity may comprise a request controller being configured to determine when to transmit the subscriber location request. The request controller may e.g. periodically determine the need for updating the location information and trigger the transmitter to transmit the subscriber location request, accordingly.

According to an embodiment, the pre-stored information may be a network address of the network communication node.

According to an embodiment, the network location management entity may further comprise a verifier for verifying the validity criterion. If the validity criterion is associated with any time period, then the verifier may further comprise a counter for time measurements.

According to an embodiment, the network location management entity may be a Gateway Mobile Location Centre (GMLC).

According to an embodiment, the network communication node may be one of: a Mobile Switching Centre (MSC), a Mobility Management Entity (MME) or a Serving GPRS Support Node (SGSN).

According to a further aspect, the invention relates to a network communication node, in particular a MSC or a MME or a SGSN, comprising a receiver for receiving a subscriber location request, the subscriber location request requesting a transmission of location information indicating a location of a mobile terminal towards a communication network, and a transmitter for transmitting an error message towards the communication network if the network communication node is not managing communications of the mobile terminal, the error message indicating that the network communication node is not possessing location information as requested by the subscriber location request. Otherwise, the network communication node may transmit the location information towards the communication network.

According to a further aspect, the invention relates to a method for managing location information of a mobile terminal in a communication network. Preferably, the method comprises providing pre-stored information on a network communication node which previously handled communications of the mobile terminal, and transmitting a subscriber location request towards the network communication node if the pre-stored information fulfills a validity criterion, e.g. one of the criteria mentioned herein, the subscriber location request requesting a transmission of location information of the mobile terminal.

According to an embodiment, the subscriber location request may be transmitted by a network location management entity, in particular by a GMLC, towards the network communication node, in particular towards a MSC or MME or SGSN. The method may further comprise receiving the subscriber location request by the network communication node, verifying, by the network communication node, whether the network communication node is managing communications of the mobile terminal, and transmitting an error message by the network communication node towards the network location management entity if the network communication node is not managing communications of the mobile terminal. The error message may indicate that the network communication node is not possessing location information as requested by the subscriber location request. Otherwise, the network communication node may transmit the location information towards the network location management entity.

According to a further aspect, the invention relates to a computer program with a program code for performing the method for managing location information of a mobile terminal in a communication network when run on a computer.

According to a further aspect, the invention relates to a programmably arranged network device being configured to execute a computer program for performing the method for managing location information of a mobile terminal in a communication network.

BRIEF DESCRIPTION OF THE DRAWINGS

Further embodiments will be described with reference to the following figures, in which.

DETAILED DESCRIPTION

Figure 1:
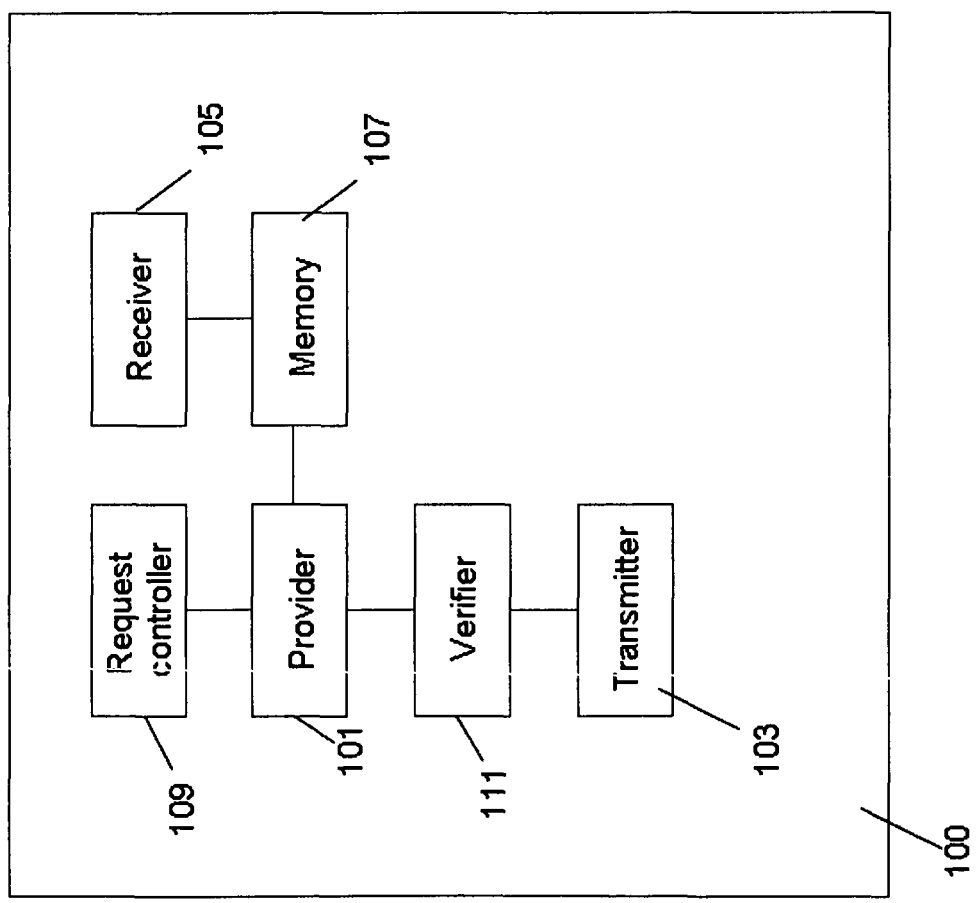
FIG. 1 shows a network location management entity according to an embodiment.

FIG. 1 shows a block diagram of a network location management entity 100, e.g. a GMLC (Gateway Mobile Location Centre), for managing location information indicating a location of a mobile terminal in a communication network. The network location management entity comprises a provider 101 for providing pre-stored information on a network communication node, e.g. a MSC (Mobile Services Switching Centre) or a MME (Mobility Management Entity) or a SGSN (Serving GPRS Support Node), which previously, i.e. at an earlier time instant, handled communications of the mobile terminal, and a transmitter 103 for transmitting a subscriber location request towards the network communication node if the pre-stored information fulfills a validity criterion, the subscriber location request requesting a transmission of the location information.

The pre-stored information, e.g. a network address of the network communication node, may originate from a Home Location Register (HLR) or from a Home Subscriber Server (HSS). Thus, the network location management entity 100 may further comprise a receiver for e.g. receiving information on the network communication node from the HLR or from the HSS.

In order to pre-store this information, the network location management entity 100 may further comprise a memory 107.

According to some embodiments, the network location management entity 100 may comprise a request controller 109 being configured to determine when to transmit the subscriber location request. By way of example, the request controller 109 may determine when a request for location is needed according e.g. to the TS 23.271 standard. According to some embodiments, the request controller 109, which forms a mechanism to determine when a request for location is needed, may create requests for location repeatedly with intervals that may vary. The intervals may, however, be chosen or assumed to be short relative to intervals of an inter-MSC handover.

Once the need of location is determined, the network location management entity 100 may verify if the network address, which forms an embodiment of information on the network communication node, used in a previous location request is stored in the network location management entity 100, e.g. in the memory 107. If the network address is available and, optionally, if the network address is found usable, then the network location management entity 100 may use that address to request location of the mobile terminal from the network communication node. In order to determine whether the network address is usable, a validity criterion may be employed. By way of example, a validity criterion may be a time period since last location request and if an indication that a last location request was successful, or any other validity criterion described herein.

If the network address, e.g. a MSC address, is not available or if it is not usable, then the network location management entity 100 may query the HLR not shown in FIG. 1 for the address of the network communication node which is serving the target, i.e. the mobile terminal. Thereafter, the network location management entity 100 may request location from the network communication node indicated by the network address provided by the HLR.

If the network communication node cannot provide location information as the target is unknown to the network communication node, the network communication node may, optionally, transmit an error message towards the network location management entity 100. Further, the network location management entity 100 may query the HLR for the address of the network communication node serving the target, and then request location from the network communication node indicated by the address provided by the HLR.

Figure 2:
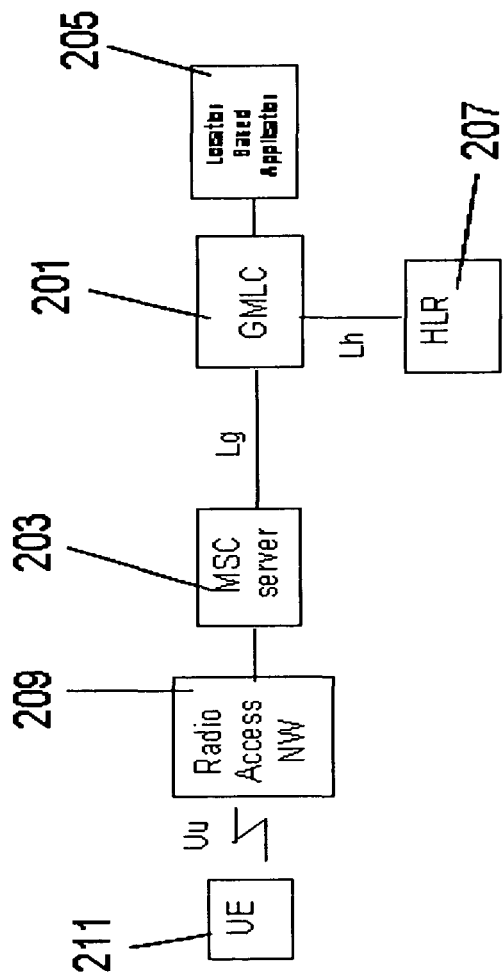
FIG. 2 shows a communication system according to an embodiment.

FIG. 2 shows a block diagram of a communication system employing the principles described herein. The communication system comprises a network location management entity 201, e.g. a GMLC which may have a structure as shown in FIG. 1, a network communication node 203, e.g. a MSC or a MSC server or a MME or a MME server or a SGSN, and a location based application 205 triggering a communication over a communication network 209 towards a mobile terminal 211, e.g. towards a user equipment (UE).

Figure 3:
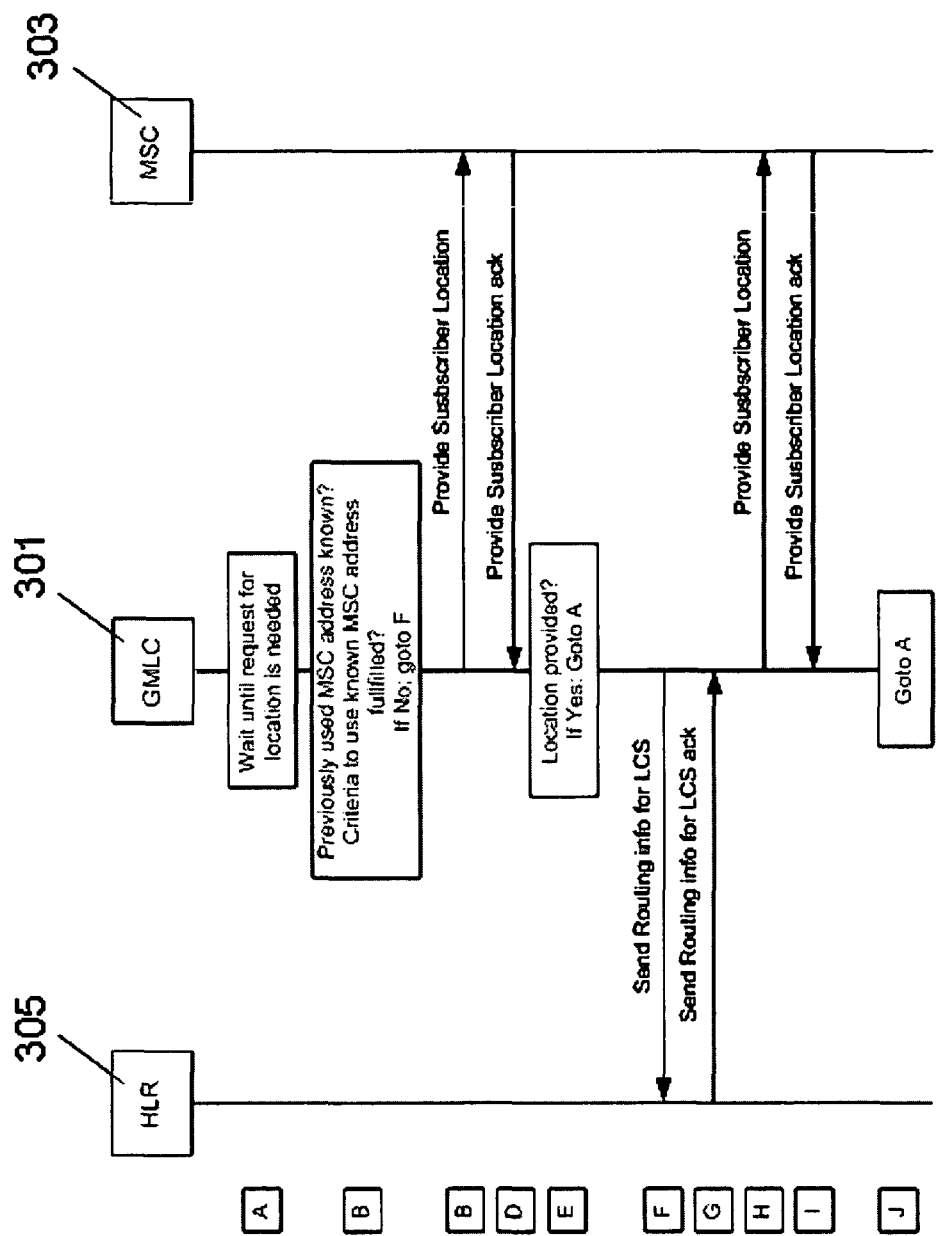
FIG. 3 shows a positioning approach according to an embodiment.

FIG. 3 shows a network positioning approach for e.g. EPC-MT-LR according to an embodiment. As depicted in FIG. 3, the messages may be exchanged between a network location management entity 301, e.g. a GMLC, a network communication node 303, e.g. a MSC, and a HLR 305.

In step A, the network location management entity 301 may wait until a request for location is needed. If the location of a mobile terminal, which is not depicted in FIG. 1, shall be provided, then, in step B, the network location management entity 301 may determine whether a previously used network address of a network communication node, e.g. of the network communication node 303, is known, e.g. pre-stored. If at least one validity criterion regarding the usability of the pre-stored network address is fulfilled, then the network location management entity 301 may transmit a Provide Subscriber Location request towards the network communication node 303. If the network communication node 303 has location information concerning the mobile terminal, then an acknowledgement message formed by e.g. a Provide Subscriber Location Acknowledgement message may be transmitted towards the network location management entity 301. Otherwise, the network communication node 303 may transmit an error message towards the network location management entity 301 or towards the HLR 305, the error message indicating that the requested subscriber, i.e. the mobile terminal, is unknown.

In step E, the network location management entity 301 or one of its elements such as the aforementioned verifier may verify whether the location information has been provided. If the location information has been provided, then the method or the system may return to step A or to a state in step A.

If, however, the location information has not been provided, then, in step F, a Send Routing Information request for LCS (LCS: location services) may be transmitted towards the HLR 305 to request information, e.g. network address, on the network communication node currently managing communications of the target mobile terminal. The HLR 305 may, in step G, transmit a Send Routing Information request for LCS Acknowledgement message comprising e.g. the network address of that network communication node, e.g. of the network communication node 303. Then, the network location management entity 301 may, in step H, transmit a Provide Subscriber Location request towards the network communication node 303, which, in step I, may respond with a Provide Subscriber Location Acknowledgement message comprising the requested information. Thereafter, the method or the system may return to step A or to a state in step A.

Figure 4:
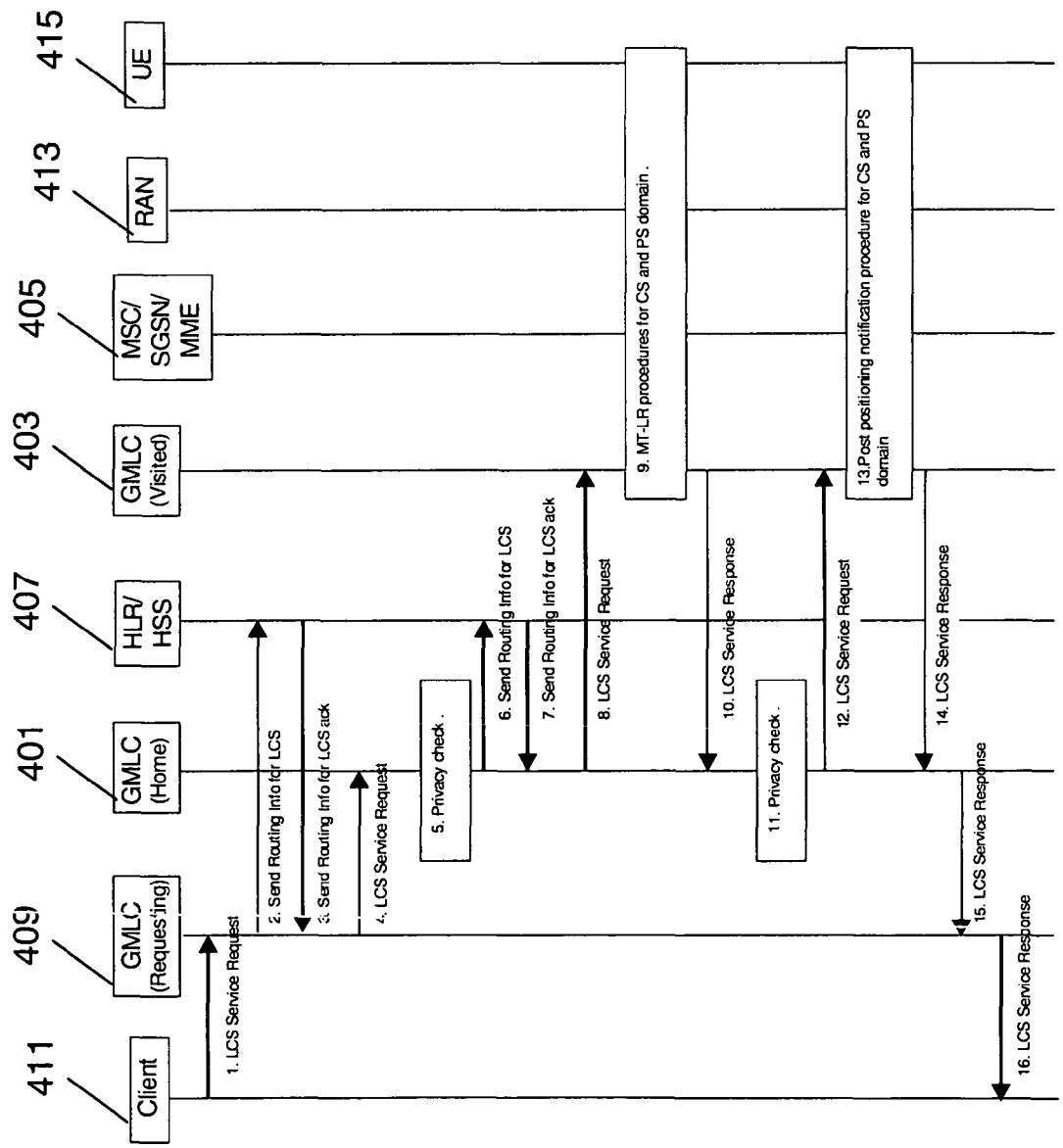
FIG. 4 shows a positioning approach according to an embodiment.

FIG. 4 a network positioning approach according to an embodiment in a communication arrangement comprising a home network location management entity 401, e.g. a home GMLC, a visited network location management entity 403, e.g. a visited GMLC, a network communication node 405, e.g. a serving MSC, a SGSN or a MME, and a HLR/HSS 407. Further, a requesting network location management entity 409, e.g. a requesting GMLC, a requesting client 411, a RAN entity 413 (RAN: Radio Access Network) and a mobile terminal 415, also referred to as US in the following, are present. The communication arrangement of FIG. 4 may correspond to a communication arrangement according to the 3GPP TS 23.271 standard.

In step 1, the client 411 may transmit a LCS service request towards the requesting network location management entity 409, which, in step 2, transmits Send Routing Info for LCS towards the HLR/HSS 407. In step 3, the HLR/HSS 407 responds with Send Routing Info for LCS Acknowledge to the requesting network location management entity 409. In step 4, the requesting network location management entity 409 transmits a LCS Service Request towards the home network location management entity 401. In step 5, the home network location management entity 401 may perform a privacy check. In step 6, the home network location management entity 401 may transmit a Send Routing Info for LCS request towards the HLR/HSS 407, which, in step 7, may respond with a Send Routing Info for LCS acknowledgement. In step 8, the home network location management entity 401 may transmit a LCS Service Request towards the visited network location management entity 403 which, thereafter, may perform the MT-LR procedures (MT-LR: Mobile Terminal Location Request) for the CS and PS domain as e.g. described in the 3GPP TS 23.271 standard.

In step 10, the visited network location management entity 403 may transmit a LCS service response towards the home network location management entity 401, which may thereafter perform a privacy check in step 11. In step 12, the home network location management entity 401 may transmit a LCS Service Request towards the visited network location management entity 403. Thereafter, in step 13, a post positioning procedure for the CS and PS domain may be performed as e.g. described in the 3GPP TS 23.271 standard.

In step 14, the visited network location management entity 403 may transmit a LCS Service Response towards the home network location management entity 401. The home network location management entity 401 may, in step 15, forward the LCS Service Response towards the requesting network location management entity 409. The requesting network location management entity 409 may, in step 16, forward the LCS Service Response towards the client 411.

Instead of always querying the HLR/HSS 407 for e.g. the network communication node 405, the requesting network location management entity 409 may use the last known network address of the network communication node 405. Thus, the requesting network location management entity 409 may directly transmit a subscriber location request towards e.g. the network communication node 405 in order to request a transmission of the location information regarding the mobile terminal 415. As the mobile terminal 415 normally stays attached to the same network communication node for a significant time period, the load on the HLR/HSS 407 may be reduced.

Figure 5:
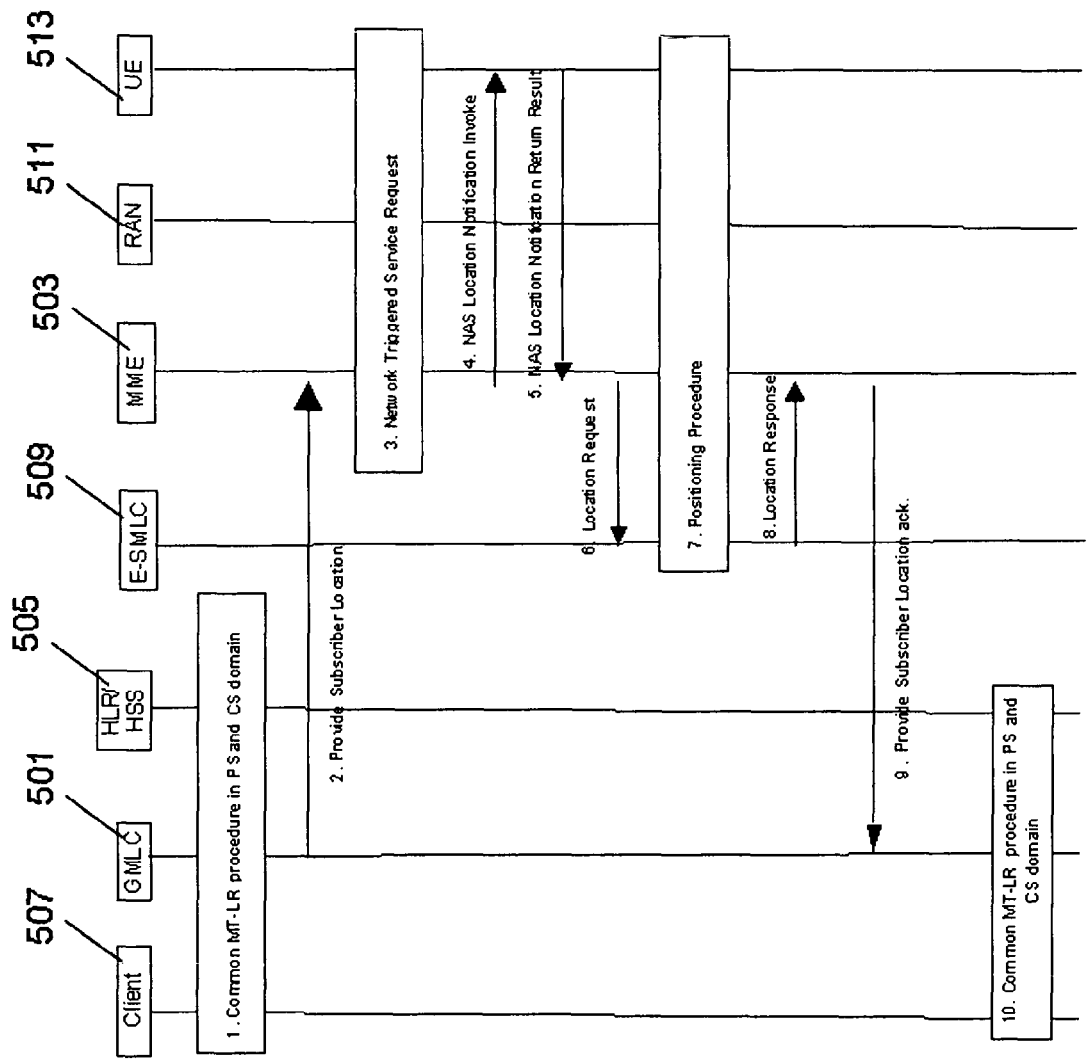
FIG. 5 shows a positioning approach according to an embodiment.

FIG. 5 shows a network positioning approach according to an embodiment in a communication arrangement comprising a network location management entity 501, e.g. a GMLC, a network communication node 503, e.g. a MSC, a SGSN or a MME, and a HLR/HSS 505. Further, a requesting client 507, a further network communication node 509, e.g. E-SMLC (SMLC: Serving Mobile Location Center), a RAN entity 511 (RAN: Radio Access Network) and a mobile terminal 513, also referred to as UE in the following, are present. By way of example, FIG. 5 illustrates the general network positioning for LCS clients external to the PLMN for EPC services. In this scenario, it may be assumed by way of example that the target mobile terminal 513 is identified using an MSISDN or IMSI.

In step 1, a common PS and CS MT-LR procedure as described e.g. the 3GPP TS 23.271 standard may be performed. In step 2, the network location management entity 501 may send a Provide Subscriber Location message to the network communication node 503 which may be indicated by the HLR/HSS 505. This message may carry the type of location information requested, e.g. current location and optionally, velocity, the UE subscriber's IMSI, LCS QoS information, e.g. accuracy, response time, and an indication of whether the LCS client has the override capability. For a session related location request, the message may also carry the APN-NI to which the UE user has established the session. For a value added LCS client, the message may carry the client name, the external identity of the LCS client and the requestor identity, if that is both supported and available. Optionally, this message may also carry the service type. Also the message may carry the type of the LCS client name and also the type of the requestor identity if the requestor identity was included.

If the result of the privacy check at the network location management entity 501, e.g. H-GMLC/PPR, indicated that the codeword shall be sent to the mobile terminal 513, then this message may carry also the codeword received from the LCS client. For a PLMN operator LCS client, this message may carry the internal identity of the LCS client. If the requestor identity is provided, then the network location management entity 501 may send it as separate information. The message also may carry the indicators of privacy related action as e.g. described in the TS 23.271 standard, if provided by the network location management entity 501.

In step 3, if the network location management entity 501 is e.g. located in another PLMN (Public Land Mobile Network) or in another country, then the network communication node 503 may first authenticate that a location request is allowed from this PLMN or from this country. Further, the network communication node 503 may check or verify whether it is serving the mobile terminal 513, e.g. that the mobile terminal 513 is neither detached nor suspended. If the mobile terminal 513 is either detached or suspended, an error response may be returned by the mobile terminal 513.

If the PSL message from the network location management entity 501 includes the indicators of privacy related action, then the network communication node 503 may determine a required privacy related action as described e.g. in the TS 23.271 standard. If the mobile terminal 513 is in the ECM-IDLE state, then the network communication node 503 may perform a network triggered service request as defined e.g. in TS 23.401 in order to establish a signalling connection with the mobile terminal 513, and assign e.g. a specific eNodeB.

In step 4, if the location request originates from a value added LCS client and the indicators of privacy related action indicates that the mobile terminal 513 must either be notified or notified with privacy verification and the mobile terminal 513 supports notification of LCS, a NAS notification invoke message may be sent to the target UE indicating the type of the location request from the LCS client 507, e.g. current location or "current or last known location", and the identity of the LCS client 507 and the requestor identity, if that is both supported and available, whether privacy verification is required. Also the message may indicate the type of the LCS client 507 name and also the type of the requestor identity if the requestor identity was included. Moreover, the message may carry also the service type and the codeword. Optionally, the network communication node 503 may, after sending the NAS Location Notification Invoke message, continue in parallel with the location process, i.e. continue to step 6 without waiting for a LCS Location Notification Return Result message of step 5.

In step 5, the mobile terminal 513 (UE) may notify the UE user of the location request and, if privacy verification was requested, may wait for the user to grant or withhold permission. The mobile terminal 513 may then return a notification result to the network location management entity 501 indicating, if privacy verification was requested, whether permission is granted or denied. Optionally, this message can be returned some time after step 4, but before step 9. If the UE user does not respond after a predetermined time period, the network communication node 503 may infer a "no response" condition. The network communication node 503 may return an error response to the network location management entity 501 if privacy verification was requested and either the UE user denies permission or there is no response with the UE privacy profile received from the network location management entity 501 indicating barring of the location request.

In step 6, the network location management entity 501 may select a E-SMLC as described in one of the aforementioned standards and may send Location Request message to the selected E-SMLC, e.g. towards the network communication node 509 forming e.g. a E-SMLC. Once the network location management entity 501 has selected the E-SMLC, it may continue to use that E-SMLC for the duration of the session. The Location Request may include the type of location information requested, the requested QoS, identity of serving cell and UE location capabilities.

According to some implementations, if the mobile terminal 513 is in a connected mode, then the network location management entity 501, e.g. a MME, may not have the most current serving cell identity if there was an intra-MME handover.

Thereafter, in step 7, a positioning procedure as described in one of the aforementioned standards may be performed. In step 8, the network communication node 509 may transmit a Location Response message towards the network communication node 503 which, in step 9, may transmit a Provide Subscriber Location acknowledgement message towards the network location management entity 501. In step 10, a common MT-LR procedure in the PS and CS domain may be performed as described in one of the aforementioned standards.

Figure 6:
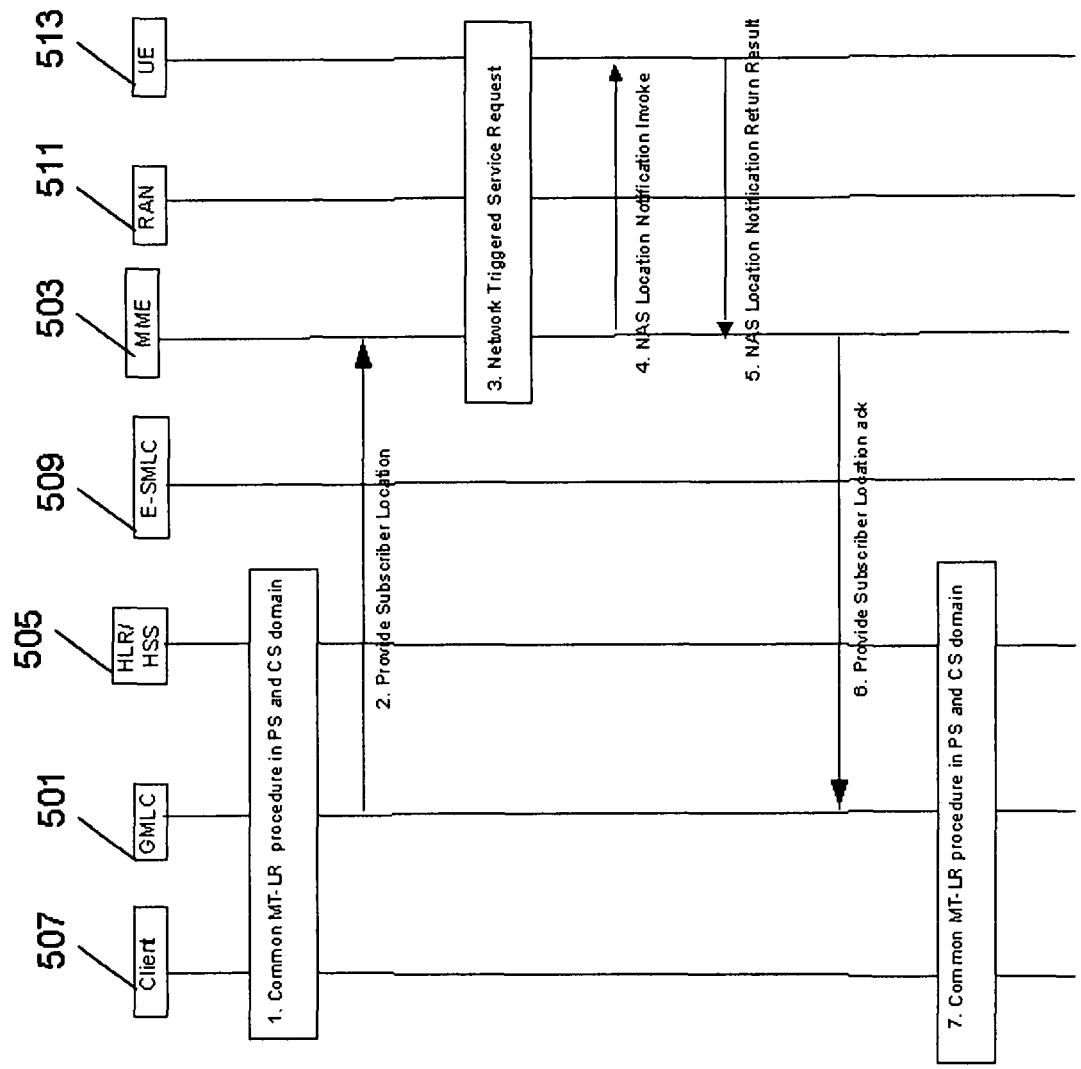
FIG. 6 shows a positioning approach according to an embodiment.

FIG. 6 shows a network positioning approach according to an embodiment in the communication arrangement shown in FIG. 5. In particular, the embodiment of FIG. 6 addresses a post positioning notification and verification procedure.

In step 1, a common PS and CS MT-LR procedure as described e.g. the 3GPP TS 23.271 standard may be performed.

In step 2, the network location management entity 501 may send a Provide Subscriber Location message to the network communication node 503 with an indication of "notification only". This message may carry the UE subscriber's IMSI. For a session related location request, the message may also carry the APN-NI to which the user has established the session. For a value added LCS client, the message may carry the client name, the external identity of the LCS client and the requestor identity if that is both supported and available, optionally the message may also carry the Service Type. Also the message may carry the type of the LCS client name and also the type of the requestor identity if the requestor identity was included. If the result of the privacy check at H-GMLC/PPR 505 indicated that the codeword shall be sent to the UE user, the message may carry also the codeword received from the LCS client 507. For a PLMN operator LCS client 507, the message may carry the internal identity of the LCS client 507. If the requestor identity is provided, the network location management entity 501 may send it as separate information.

In step 3, the network communication node 503 may first check as to whether the mobile terminal 513 is served, e.g. whether is detached or suspended. If the mobile terminal 513 is not served, then an error response may be returned. The network communication node 503 may determine a required privacy related action as described in of the aforementioned standards based on the indicators of privacy related action in the PSL message from the network location management entity 501. If the mobile terminal 513 is in the ECM-IDLE state, then the network communication node 503 may perform performs a network triggered service request as defined e.g. in the TS 23.401 standard in order to establish a signaling connection with the mobile terminal 513 and to assign a specific eNodeB.

In step 4, a notification invoke message may be sent to the target mobile terminal 513 indicating a location type of notification and verification only, the identity of the LCS client 507 and the requestor identity if that is both supported and available, whether privacy verification is required. Also the message may indicate the type of the LCS client name and also the type of the requestor identity if the requestor identity was included. Moreover, the message may carry also the service type and the codeword.

In step 5, the target mobile terminal 513 (UE) notifies the UE user of the location request and, if privacy verification was requested, waits for the user to grant or withhold permission. The mobile terminal 513 then may return a notification result to the network communication node 503 indicating, if privacy verification was requested, whether permission is granted or denied. If the UE user does not respond after a predetermined time period, the network communication node 503 may infer a "no response" condition. The network communication node 503 may return an error response to the network location management entity 501 if privacy verification was requested and either the UE user denies permission or there is no response with the UE subscription profile indicating barring of the location request.

In step 6, the mobile terminal 513 may return the indication of successful notification and verification result, if it has received a NAS Location Notification Return Result indicating that permission is granted. If a LCS Location Notification Return Result message indicating that permission is not granted is received, or there is no response, with the requested privacy action or the UE subscription profile indicating barring of location, the network communication node 503 may return an error response to the network location management entity 501.

In step 7, a common MT-LR procedure in PS and CS domain as described in one of the aforementioned standards may be performed.

Figure 7:
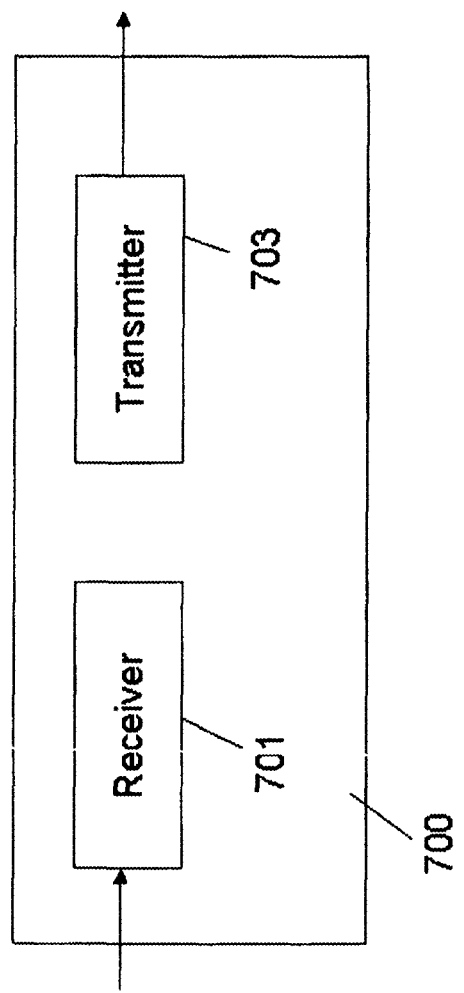
FIG. 7 shows a block diagram of a network communication node.

FIG. 7 shows a block diagram of a network communication node 700, in particular a MSC or a MME or a SGSN The network communication node 700 comprises a receiver 701 for receiving a subscriber location request, the subscriber location request requesting a transmission of location information indicating a location of a mobile terminal towards a communication network, and a transmitter 703 for transmitting an error message towards the communication network if the network communication node is not managing communications of the mobile terminal, the error message indicating that the network communication node is not possessing location information as requested by the subscriber location request, or otherwise for transmitting the location information towards the communication network. According to some embodiments, the network communication node 700 may have the functionality of the MME or the SGSN or the MSC depicted in FIGS. 2 to 6.

The invention claimed is:

1. A network location management entity for managing location information indicating a location of a mobile terminal in a communication network, the network location management entity comprising:
    a provider configured to provide pre-stored information about a network communication node which has handled communications of the mobile terminal; and
    a transmitter configured to transmit a subscriber location request towards the network communication node if the pre-stored information fulfills a validity criterion set;
    wherein the subscriber location request requests transmission of location information for the mobile terminal; and
    wherein the validity criterion set includes the criterion that a time period which elapsed after transmission of a previous subscriber location request towards the network communication node is shorter than or equal to a first predetermined time period.

2. The network location management entity of claim 1 wherein the validity criterion set also includes the criterion that the location information indicating a location of the mobile terminal was received from the network communication node upon transmitting a previous subscriber location request towards the network communication node.

3. The network location management entity of claim 1:
    wherein the pre-stored information originates from a Home Location Register or from a Home Subscriber Server; and
    wherein the validity criterion set also includes the criterion that a time period which elapsed after a reception of the pre-stored information from the Home Location Register or the Home Subscriber Server is shorter than a second predetermined time period.

4. The network location management entity of claim 1, wherein the validity criterion set also includes the criterion that a storage period of the pre-stored information is shorter than or equal to a second predetermined time period.

5. The network location management entity of claim 1:
    wherein the transmitter is configured to transmit a routing information request towards a Home Location Register or towards a Home Subscriber Server if the pre-stored information does not fulfill the validity criterion set; and
    wherein the routing information request requests transmission of information about a network communication node currently managing communications of the mobile terminal.

6. The network location management entity of claim 1, further comprising:
    a receiver configured to receive the information about the network communication node over a communication network in response to transmission of a routing information request towards a Home Location Register or towards a Home Subscriber Server; and memory for storing the received information.

7. The network location management entity of claim 1, further comprising:

a receiver configured to receive the location information over the communication network from the network communication node.

8. The network location management entity of claim 1:

wherein the transmitter is configured to transmit a routing information request towards a Home Location Register or towards a Home Subscriber Server in response to reception of an error message received from the network communication node;

wherein the error message indicates that the network communication node is not currently managing communications of the mobile terminal; and wherein the routing information request requests transmission of information about a network communication node that is currently managing communications of the mobile terminal.

9. The network location management entity of claim 1, further comprising a request controller configured to determine when to transmit the subscriber location request.

10. The network location management entity of claim 1, wherein the pre-stored information includes a network address of the network communication node.

11. The network location management entity of claim 1, further comprising a verifier configured to verify the validity criterion set.

12. The network location management entity of claim 1, wherein the network communication node is one of: a Mobile Switching Centre (MSC), a Mobility Management Entity (MME) or a Serving GPRS Support Node (SGSN).

13. A method for managing location information of a mobile terminal in a communication network, the method comprising:

providing pre-stored information about a network communication node which has handled communications of the mobile terminal; and transmitting a subscriber location request towards the network communication node if the pre-stored information fulfills a validity criterion set;

wherein the subscriber location request requests transmission of location information of the mobile terminal; and wherein the validity criterion set includes the criterion that a time period which elapsed after transmission of a previous subscriber location request towards the network communication node is shorter than or equal to a first predetermined time period.

14. The method of claim 13 wherein the subscriber location request is transmitted by a network location management entity towards the network communication node, and wherein the method further comprises:

receiving the subscriber location request by the network communication node;

verifying, by the network communication node, whether the network communication node is currently managing communications of the mobile terminal; and transmitting an error message by the network communication node towards the network location management entity if the network communication node is not currently managing communications of the mobile terminal, the error message indicating that the network communication node does not possess the location information requested by the subscriber location request; and transmitting the requested location information towards the network location management entity if the network communication node is currently managing communications of the mobile terminal and possesses the requested location information.

15. The method of claim 14:

wherein network location management is a Gateway Mobile Location Center (GMLC); and wherein the network communication node is a Mobile Switching Center (MSC) or Mobility Management Entity (MME).

* * * * *